United States Patent [19]

Ryan

[11] Patent Number: 4,626,890

[45] Date of Patent: * Dec. 2, 1986

[54] METHOD AND APPARATUS FOR REMOVING PHASE MODULATION FROM THE COLOR BURST

[75] Inventor: John O. Ryan, Cupertino, Calif.

[73] Assignee: Macrovision, San Jose, Calif.

[ * ] Notice: The portion of the term of this patent subsequent to Mar. 18, 2003 has been disclaimed.

[21] Appl. No.: 627,619

[22] Filed: Jul. 3, 1984

[51] Int. Cl.⁴ .................. H04N 9/45; H04N 9/455; H04N 9/80; H04N 7/167
[52] U.S. Cl. .................................. 358/19; 358/319; 358/120; 360/37.1
[58] Field of Search ............... 358/118, 114, 120, 123, 358/124, 319, 16, 17, 19, 12, 20, 25, 28, 36, 310; 360/37.1

[56] References Cited

U.S. PATENT DOCUMENTS

| | | | |
|---|---|---|---|
| 4,145,705 | 3/1979 | Yoshinaka | 358/19 X |
| 4,327,373 | 4/1982 | Gomi | 358/28 |
| 4,413,274 | 11/1983 | Hosoya | 358/25 |
| 4,468,687 | 8/1984 | Munezawa et al. | 358/19 |
| 4,544,943 | 10/1985 | Quan | 358/25 |

Primary Examiner—John W. Shepperd
Assistant Examiner—Michael P. Dunnam
Attorney, Agent, or Firm—Cushman, Darby & Cushman

[57] ABSTRACT

A video signal of the type having phase modulation induced in the color burst component thereof to inhibit video tape recording, is modified to remove the phase modulation and permit acceptable video tape recording. The phase modulated color burst component of an incoming video signal drives a phase lock loop, which regenerates a color burst component free of the modulation for insertion into the video signal.

6 Claims, 1 Drawing Figure

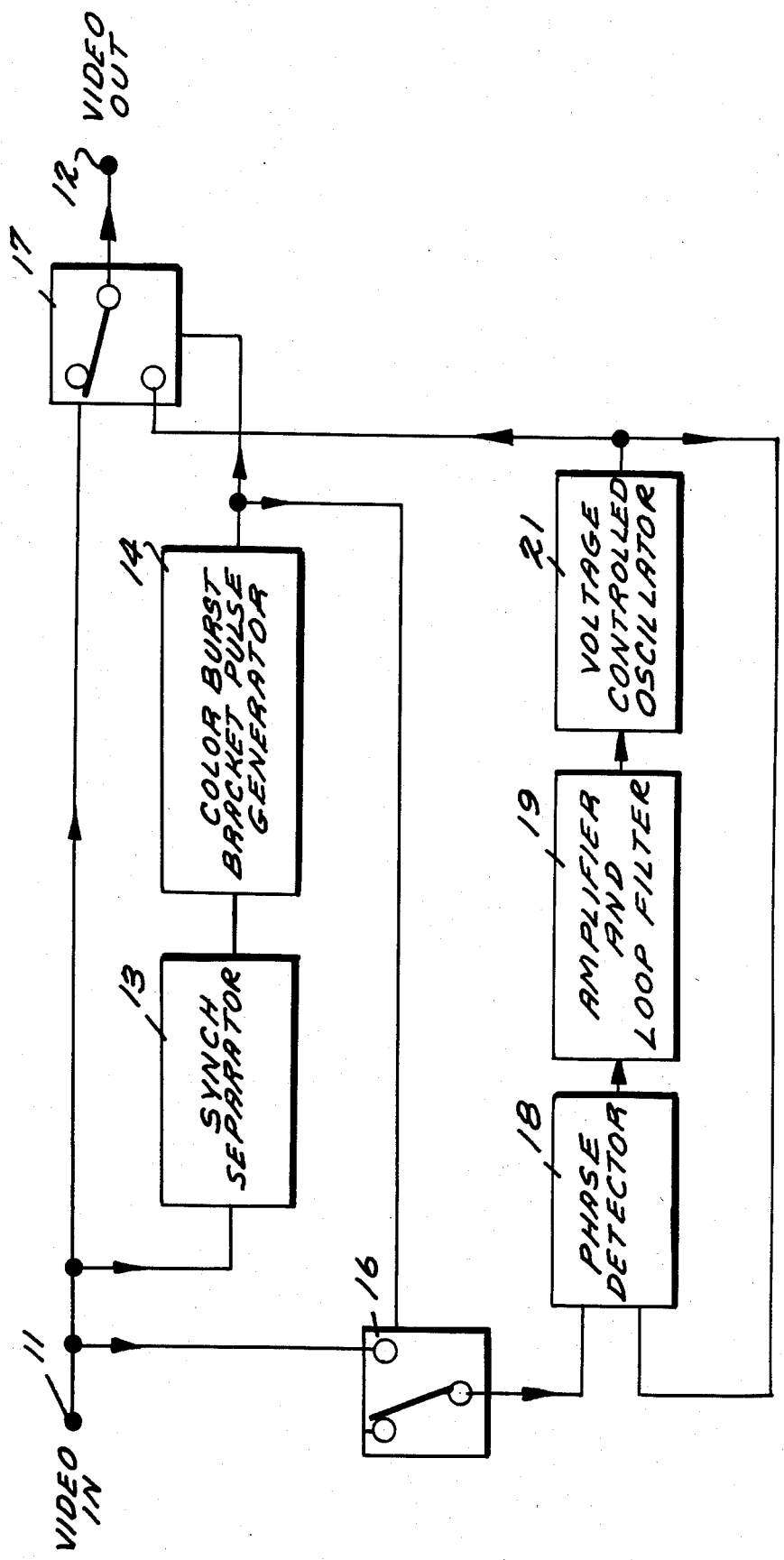

METHOD AND APPARATUS FOR REMOVING PHASE MODULATION FROM THE COLOR BURST

BACKGROUND OF THE INVENTION

The present invention pertains to a method and apparatus for processing a video signal. More particularly, the present invention pertains to such a method and process for removing modulation from the color burst component of a video signal.

In a copending application entitled Method and Apparatus For Processing a Video Signal, Ser. No. 551,696 now U.S. Pat. No. 4,577,216, filed Nov. 14, 1983, there is disclosed a method and apparatus for processing a color video signal in a manner such as to inhibit the making of acceptable video tape recordings thereof. However, the processing of the color video signal is such that a conventional television receiver produces a normal color picture from the modified signal.

In both the NTSC and PAL color television systems color information is transmitted on a subcarrier signal. In both systems the precise color at any point in the picture is determined by the phase of the subcarrier relative to some reference phase, while the degree of saturation of the color is determined by the amplitude of the subcarrier. In order for a television receiver to correctly reproduce colors, the receiver requires information concerning the above-mentioned reference phase. This information is transmitted as part of the video signal in the form of a burst of about 9 cycles of subcarrier following the horizontal synchronizing pulse, and is referred to as a color burst. This color burst signal is used in the television receiver to phase lock a crystal oscillator, thus generating a continuous subcarrier signal at the reference phase which is then used to demodulate the color information. It is normal for the phase-locked crystal oscillator in the television receiver to have a fairly long time constant, on the order of a few milliseconds. The long time constant ensures that the oscillator will ignore short term phase perturbations of the color burst signal as might be caused by noise.

In accordance with applicant's copending application Ser. No. 551,696, the color burst signal of a color video signal is phase modulated with a noise signal to produce a modified signal. The modified signal is such that the phase modulation is ignored by a television receiver, which produces a normal color picture from the color video signal.

As far as color video tape recorders are concerned, it is common practice to utilize the color burst component of a video signal to generate velocity error-correction signals to compensate for fluctuations of the head to tape velocity. The velocity error corrector circuit in a video tape recorder measures the phase of the color burst signal on a line-by-line basis. Any variation of phase is assumed to be due to head to tape velocity errors, and a correction signal is generated. The correction signal alters the phase of the chrominance signal in an attempt to eliminate these errors.

Since in accordance with the invention disclosed in applicant's copennding application Ser. No. 551,696, deliberate phase errors are introduced into the color burst signal, the velocity error correction circuit in the video tape recorder will attempt to eliminate the deliberate phase errors thus introduced. In so doing, the velocity error correction circuit will transfer the error from the color burst to the chrominance signal, thus giving rise to severe color noise in the viewed picture, and inhibiting the making of acceptable video tape recordings of the color video signal.

As disclosed in applicant's copending application, various types of phase modulation are suitable. The phase modulation can be any suitable multivalued noise signal for driving a phase modulator. Alternatively, the color burst signal can be caused to randomly assume one of two phase angles equally displaced about its nominal value. In fact, random, pseudo-random, periodic signals and combinations thereof can be used for the phase modulation. Since the filling of applicant's copening application Ser. No. 551,696 it has been found that a best mode embodiment of the invention there disclosed and claimed may be alternate phase reversals of the color burst signal, i.e. modulating the phase by 180°.

OBJECTS AND SUMMARY OF THE INVENTION

It is an object of the present invention to provide a method and apparatus for processing a video signal of the type having phase modulation induced in the color burst component thereof to inhibit video tape recording, so as to remove the phase modulation of the color burst signal and permit acceptable video tape recording of the color video signal.

Briefly, in accordance with one embodiment of the invention, a phase lock loop is provided. The phase modulated color burst component of an incoming video signal is switched through the phase lock loop in order to regenerate a color burst subcarrier free of modulation and having a phase equal to the mean phase of the modulated color burst component. This regenerated color burst subcarrier component is inserted in the video signal in place of the modulated color burst component, whereby acceptable video recordings of the color video signal can then be made.

Other objects and advantages of the present invention will be apparent from the following description of a best mode embodiment thereof taken in conjunction with the accompanying drawing.

BRIEF DESCRIPTION OF THE DRAWING

The single drawing FIGURE is a block diagram of one embodiment of apparatus suitable for practicing the invention.

DETAILED DESCRIPTION

In general terms in accordance with the present invention, a crystal oscillator is phase-locked by the color burst component of the incoming video signal. The bandwidth of the phase lock loop containing the crystal oscillator is made low enough (less than 50 Hz for example) so that the regenerated subcarrier contains none of the relatively high frequency phase modulation of the color burst. The phase of the regenerated subcarrier is arranged to be equal to the mean phase of the color burst. The color burst component of the video signal is then replaced with a burst of this regenerated subcarrier, and the resultant video signal may be recorded normally on a video tape recorder.

Many forms of apparatus are suitable for practicing the present invention. Referring to the drawing, a block diagram is illustrated of one suitable arrangement for practicing the present invention. An input video terminal 11 is provided for receiving the incoming color video signal having the phase modulation of its color burst component for inhibiting acceptable tape recording thereof. An output video terminal 12 is provided for outputting the video signal after processing in accordance with the invention. Referring to the drawing, a synch separator 13 is provided as well as a color burst bracket pulse generator 14. The synch separator, suitable circuits for which are known, generates synchronizing pulses from the incoming color video signal. The trailing edges of these pulses trigger the color burst bracket pulse generator 14, which in its simplest form can simply be a monostable multivibrator of about 3 microseconds duration. The output of the color burst bracket pulse generator 14 controls two electronic switches generally indicated in the drawing by reference numerals 16 and 17. The position of these electronic switches 16 and 17 shown in the drawing correspond to the stable state of the color burst bracket pulse generator 14. In such a state, the incoming video signal is simply switched directly along a first video path through the switch 17 to the output video terminal 12. However, during the period of time corresponding to the color burst component of the incoming video signal, the color burst bracket pulse generator 14 switches the electronic switches 16 and 17. The modulated color burst component of the incoming video signal is thus switched to a second video path which comprises a phase lock loop. This phase lock loop comprises a phase detector 18, an amplifier and loop filter 19, and a voltage controlled oscillator 21. Phase lock loop techniques are well known to those skilled in the art. The phase detector 18 comprises the phase of the incoming color burst component of the video signal and the output of the voltage controlled oscillator 21, generating an error signal applied to the amplifier and loop filter 19 for filtering, and then applied to the voltage controlled oscillator 21. This voltage applied to the voltage controlled oscillator 21 changes the frequency thereof in a direction that reduces the phase difference between the input signal and the voltage controlled oscillator 21. Thus, the output of the phase lock loop circuit applied to the output video terminal 12 is a continuous sine wave having a phase equal to the average phase of the incoming color burst component of the color video signal. The manner of selecting transfer functions for the phase detector 18, amplifier and loop filter 19, and voltage controlled oscillator 21 in a classic phase lock loop are well known. The transfer functions should be chosen to insure that the output of the voltage controlled oscillator 21 contains none of the phase modulation present on the incoming color burst component.

The present invention can be practiced by modifying certain elements already present in a video tape recorder. For example, if the switch 17 were removed from the block diagram shown in the drawing figure, the remaining blocks constitute a system for generating a continuous subcarrier from the color burst component. Virtually all video tape recorders have such a system as an integral part of their chrominance circuitry. Consequently, if it is desired to build a video tape recorder which is immune to deliberately induced color burst phase modulation, by the additional inclusion of a switch corresponding to switch 17 in the figure, this can be achieved.

There are known devices referred to as stabilizing amplifiers, which are sometimes used in television applications for "cleaning up" video signals. That is, in video systems the synch pulses and color burst components sometimes pick up noise and stabilizing amplifiers are used in television studios for "cleaning up" these aspects of video signals. In accordance with the present invention, such stabilizing amplifiers can be used and modified in accordance with the present invention to process a video signal having a phase modulated color burst component, to thereby generate a new color burst component for insertion into the color video signal that is free from the phase modulation.

Although the invention has been described with respct to a particular exemplary apparatus suitable for practicing same, it should be clear that other means for practicing the method of this invention, including those referred to in the specification as well as others, are suitable and fall within the true spirit and scope of the present invention.

What is claimed is:

1. A method of removing phase modulation induced in the color burst of a video signal for inhibiting the making of acceptable video recordings of the video signal comprising the steps of:

switching the phase modulated color burst component through a phase lock loop to regenerate a color burst subcarrier free of modulation and having a phase equal to the mean phase of the modulated color burst component; and inserting the regenerated color burst subcarrier component in the video signal, whereby acceptable video recordings of the video signal can then be made.

2. A method in accordance with claim 1 including the step of switching the video signal through the phase lock loop only during the color burst portion of the video signal.

3. A method in accordance with claim 1 wherein the bandwidth of the phase lock loop which is provided is made sufficiently low that the regenerated color burst subcarrier is free of the phase modulation induced in the color burst.

4. Apparatus for removing phase modulation of the type induced in the color burst of a video signal for inhibiting the making of acceptable video recordings of the video signal comprising:

an input video terminal and an output video terminal;

a first video path and a second video path;

switching means for selectively coupling the first or second video paths between the input and output video terminals;

means connected to the input video terminal for controlling said switching means such that a modulated color burst of a video signal is switched through said second video path, and other portions of the video signal are switched through said first video path;

said first video path being a direct connection and said second video path being a phase lock loop, whereby said phase lock loop regenerates a color burst subcarrier free of modulation.

5. Apparatus in accordance with claim 4 wherein said phase lock loop comprises a phase detector, an amplifier and loop filter, and a voltage controlled oscillator.

6. Apparatus in accordance with claim 4 wherein said means connected to the input video terminal for controlling said switching means comprises a synch separator for generating synchronizing pulses from an incoming video signal, and a color-burst bracket generator which is triggered by said synch separator to operate said switching means to switch the modulated color burst of a video signal through said phase lock loop.

* * * * *